(12) United States Patent
Atamer

(10) Patent No.: US 7,225,176 B2
(45) Date of Patent: May 29, 2007

(54) SYSTEM AND METHOD FOR CASE-BASED REASONING

(75) Inventor: Allen Atamer, Richmond Hill (CA)

(73) Assignee: Casebank Technologies Inc., Brampton, Ontario (CA)

( * ) Notice: Subject to any disclaimer, the term of this patent is extended or adjusted under 35 U.S.C. 154(b) by 516 days.

(21) Appl. No.: 10/396,388

(22) Filed: Mar. 26, 2003

(65) Prior Publication Data

US 2004/0193560 A1    Sep. 30, 2004

(51) Int. Cl.
*G06F 17/00* (2006.01)
*G06N 5/02* (2006.01)
(52) U.S. Cl. ............................ 706/46; 706/50; 706/45
(58) Field of Classification Search ................ 706/46, 706/50, 45; 707/102
See application file for complete search history.

(56) References Cited

U.S. PATENT DOCUMENTS 5,581,664 A * 12/1996 Allen et al. .................... 706/46
5,822,743 A * 10/1998 Gupta et al. .................. 706/50
6,026,393 A    2/2000 Gupta et al.
6,208,987 B1 * 3/2001 Nihei ............................ 707/3
6,907,436 B2 * 6/2005 Ye et al. ...................... 707/203

OTHER PUBLICATIONS

Australian Bureau of Statistics, Organizing Frequency Distribution Tables, Commonwealth of Australia, 2001, pp. 1-5.*
Kohlmaier, Andreas et al., Evaluation of a Similarity-based Approach to Customer-adaptive Electronic Sales Dialogs, Artificial Intelligence—Knowledge-Based Systems Group, 10 pgs, Department of Computer Science, University of Kalserstautem 67653 Kalserstautem, Germany.

* cited by examiner

*Primary Examiner*—Joseph P Hirl
(74) *Attorney, Agent, or Firm*—Bereskin & Parr

(57) ABSTRACT

A case based reasoning system and method for matching a problem case to at least one solved case. A solved case database stores solved case data correlated to a plurality of solved cases. An attribute database stores a set of attributes and observation cost data corresponding to each of the attributes, such that the observation cost data corresponding to an attribute is correlated to a cost of determining an attribute value corresponding to the attribute. A set of potential solved cases is determined. A set of relevant attributes for which at least one potential solved case has an attribute value and for which no corresponding problem attribute value has been input is determined and ranked based on the observation cost data for each relevant attribute.

15 Claims, 6 Drawing Sheets

| ATTRIBUTE I.D. | QUESTION | ATTRIBUTE TYPE | OBSERVATION EXPENSE | OBSERVATION TIME |
|---|---|---|---|---|
| A | WILL ENGINE START? | BOOLEAN | .1 | .1 |
| B | ARE BRAKES FUNCTIONING? | BOOLEAN | .1 | .2 |
| C | ARE PISTONS SCORED? | BOOLEAN | .3 | .5 |
| D | IS TANK FULL OF GAS? | BOOLEAN | .1 | .1 |
| ... | ... | ... | ... | ... |
| Y | WHAT IS ENGINE TEMP.? | NUMBER | .2 | .2 |
| Z | IS BATTERY DEAD? | BOOLEAN | .1 | .2 |
| AA | CAN BATTERY STORE A CHARGE? | BOOLEAN | .3 | .4 |
| BB | ARE TERMINALS PROPERLY CONNECTED? | BOOLEAN | .1 | .2 |

Fig. 3

SYSTEM AND METHOD FOR CASE-BASED REASONING

FIELD OF THE INVENTION

This invention relates to the field of case-based reasoning systems.

BACKGROUND OF THE INVENTION

Case-based reasoning ("CBR") systems provide diagnostic and analytical assistance in solving problems. CBR systems match the observed characteristics or attribute values of a new problem to those of previously solved cases stored in a database. CBR systems are useful in many fields, from mechanical to medical, in which diagnostic assistance and expertise are helpful in solving problems.

The applicant has obtained U.S. Pat. Nos. 5,822,743 and 6,026,393, which describe improved CBR systems.

CBR systems typically rank potential matching solved cases on the basis of attribute values matching facts known about the problem. For example, an attribute value may be the temperature of a patient or of a component.

Questions are then presented to the user to determine additional attribute values of the new problem, and thereby reduce the number of potential matching solutions. The answers to each question typically require some form of investigation, such as (in a mechanical context) measuring the temperature of a particular component or dissembling a particular component to determine wear patterns. The questions posed are usually ranked by their relevance to the particular problem. Several of the highest ranking questions are presented to the user, who determines which question he or she will investigate and answer next.

The questioning process continues with the answers being used by the CBR system to reduce the number of potential matching cases (and corresponding solutions) until the user is satisfied that the solution to the problem has been located, or is not present in the solved cases database.

While some existing CBR systems, including the applicant's systems described in U.S. Pat. Nos. 5,822,743 and 6026,393, work fairly well, such existing systems do not capture all of the reasoning expertise of experts. Accordingly, the inventor has developed improved CBR systems and methods for ranking potential questions, which more closely emulate the diagnostic analysis conducted by an expert.

SUMMARY OF THE INVENTION

In one aspect, the present invention is directed towards a method for matching at least one solved case to a problem case. The steps of the method include:

(a) storing solved case data correlated to a plurality of solved cases, wherein the solved case data comprises a set of attribute values corresponding to each of the solved cases;

(b) storing attribute data corresponding to a set of attributes;

(c) storing observation cost data corresponding to each attribute in the set, wherein the observation cost data corresponding to an attribute is correlated to a cost of determining an attribute value corresponding to the attribute;

(d) receiving problem attribute values correlated to the problem case;

(e) determining a list of potential solved cases from said solved case data by comparing the problem attribute values to the attribute values of the plurality of solved cases;

(f) determining a list of relevant attributes for which at least one potential solved case has an attribute value and for which no corresponding problem attribute value has been input;

(g) ranking said list of relevant attributes based at least in part on the observation cost data.

Preferably, the method also includes the step of receiving a problem attribute value corresponding to a relevant attribute.

In another aspect, the present invention is directed towards a case-based reasoning system for matching at least one solved case to a problem case. The reasoning system includes a solved case database, an attribute database, an input device for inputting (or entering) problem attribute values correlated to the problem case, and a processor.

The solved case database stores solved case data correlated to a plurality of solved cases, wherein the solved case data includes a set of attribute values corresponding to each of the solved cases. The attribute database stores a set of attributes and observation cost data corresponding to each of the attributes, wherein the observation cost data corresponding to an attribute is correlated to a cost of determining an attribute value corresponding to the attribute.

The processor is programmed to: determine a set of at least one potential solved case from said solved case database; determine a set of relevant attributes for which at least one potential solved case has an attribute value and for which no corresponding problem attribute value has been input; determine a ranking value for each relevant attribute such that said ranking value is correlated to the observation cost data for that relevant attribute; and rank said set of relevant attributes. The system also includes an output device for displaying the set of ranked relevant attributes.

In yet another aspect, the present invention is directed towards a method for matching at least one solved case to a problem case in a case-based reasoning system. The reasoning system used by the method is provided with a solved case database storing solved case data correlated to a plurality of solved cases, wherein the solved case data comprises a set of attribute values corresponding to each of the solved cases, an attribute database storing a set of attributes and observation cost data corresponding to each of the attributes, wherein the observation cost data corresponding to an attribute is correlated to a cost of determining an attribute value corresponding to the attribute. The steps of the method include:

(a) receiving problem attribute values correlated to the problem case;

(b) determining a list of potential solved cases from said solved case database;

(c) ranking said list of potential solved cases;

(d) determining a list of relevant attributes for which at least one potential solved case has an attribute value and for which no corresponding problem attribute value has been input; and (e) determining a ranking value for each relevant attribute such that said ranking value is correlated to the observation cost data for that relevant attribute.

The present invention is further directed towards a method of creating data for use in a case-based reasoning system, the method comprising:

(a) storing solved case data correlated to a plurality of solved cases, wherein the solved case data comprises a set of attribute values corresponding to each of the solved cases;
(b) storing attribute data corresponding to a set of attributes;
(c) determining observation cost data corresponding to each of the attributes in the set, wherein the observation cost data corresponding to an attribute is correlated to a cost of determining an attribute value corresponding to the attribute; and
(d) storing the observation cost data.

BRIEF DESCRIPTION OF THE DRAWINGS

The present invention will now be described, by way of example only, with reference to the following drawings, in which like reference numerals refer to like parts and in which:

FIG. 3 is a schematic diagram of an example attribute record, as may be stored in the attributes database of FIG. 1;

DETAILED DESCRIPTION OF THE INVENTION

Figure 1:
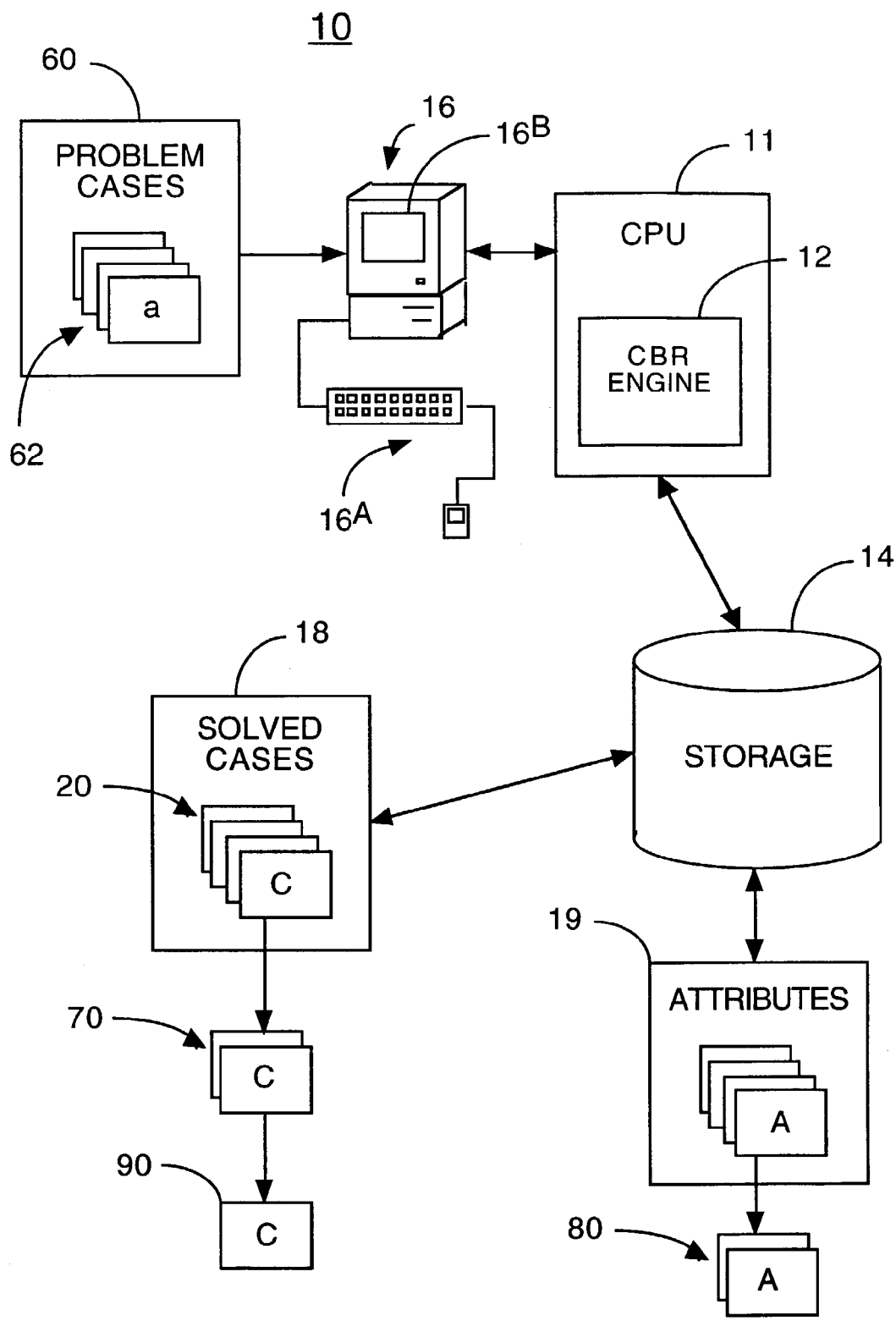
FIG. 1 is a schematic diagram of a case-based reasoning system made in accordance with the present invention.

Referring to FIG. 1, illustrated therein is a case-based reasoning system, referred to generally as 10, made in accordance with the present invention. The CBR system 10 comprises a processor or central processing unit (CPU) 11 having a suitably programmed reasoning engine 12, a data storage device 14 operatively coupled to the CPU 11, and an input/output device 16 (typically including an input component 16$^A$ such as a keyboard, and a display 16$^B$) also operatively coupled to the CPU 11. The input and output to the system 10 may occur between the system 10 and another processor (without the need of a keyboard 16$^A$ and display 16$^B$), for example if the system 10 is a fully automated diagnostic system.

The data storage device 14 stores solved case data 18 and attributes data 19. The solved case data 18 includes solved case records 20 containing data about known cases. Typically, the solved case data 18 will contain thousands of case records 20, each comprising a diagnostic solution or root cause of a problem, along with a set of attribute values.

Figure 2:
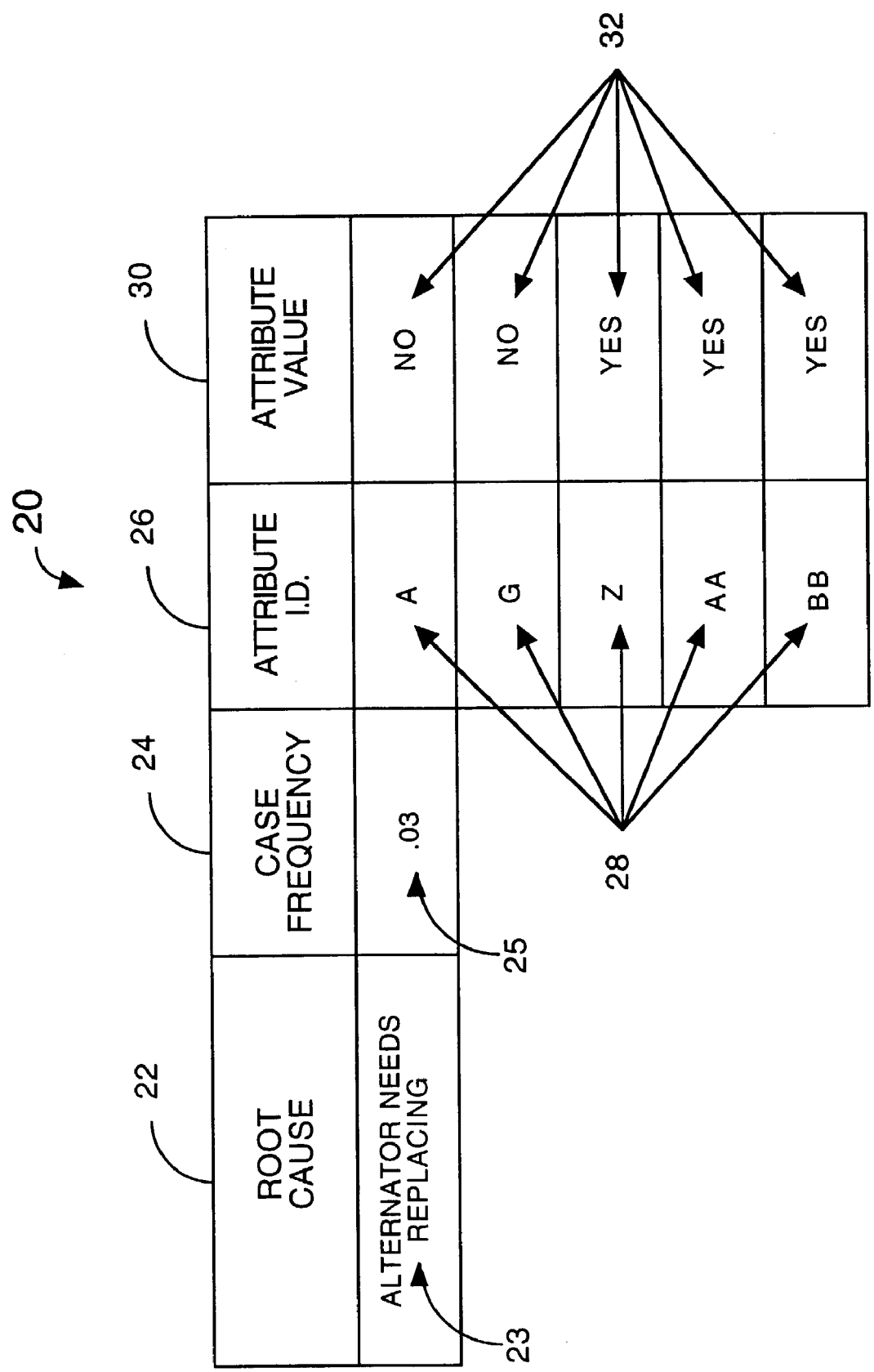
FIG. 2 is a schematic diagram of an example solved case record, as may be stored in the solved cases database of FIG. 1.

FIG. 2 illustrates an example of the type of data typically stored in a solved case record 20. The sample record 20 includes different fields of data. A root cause field 22 contains data indicating a root cause 23. For example, the root cause 23 may be that an alternator is broken and needs replacing.

A case frequency field 24 contains data 25 corresponding to the frequency of this record's 20 root cause 22 occurring relative to the frequency of the root cause 22 of other records 20 occurring. The frequency data 25 will be used to rank the record 20 relative to other records 20, as will be discussed in greater detail, below.

For example, as shown in Table 1, the frequency data 25 may indicate that the root cause 22 is very common (5), common (4), moderate (3), rare (2) or very rare (1). However, as will be understood, other scales and values may be used as appropriate. Typically, the frequency data 25 will be determined by an expert based on the expert's experience, but the data 25 may be determined by reference to empirical data.

TABLE 1

Solved Case and Attribute Properties

| Ranking | Observation Cost | Observation Time | Case Frequency |
|---|---|---|---|
| 1 | Very economical (<$100) | Very short (<30 mins) | Very rare (0.01) |
| 2 | Economical ($100–$499) | Short (30–59 mins) | Rare (0.02) |
| 3 | Moderate ($500–$4999) | Moderate (1–1.9 hrs) | Moderate (0.03) |
| 4 | Expensive ($5k–$50k) | Long (2–5 hrs) | Common (0.04) |
| 5 | Very expensive (>$50k) | Very long (>5 hrs) | Very common (0.05) |

The record 20 also includes an attribute identifier field 26, which stores data 28 correlated to specific attributes. As well, an attribute value field 30 is provided, which stores data correlated to the value 32 for each attribute 28 in the record 20. The values 32 will typically be either numerical or "symbolic".

Referring now to FIG. 3, illustrated therein is an example of the type of data typically stored in the attributes database 19. The database contains an attribute identifier field 34, which stores a unique attribute identifier 28 (which may also be a pointer) for each attribute in the solved case records 20. A question field 36 stores a question 38 associated with each attribute identifier 28. An attribute type field 40 stores data indicating the type of attribute value (eg. numerical or "symbolic", although ranges of numbers and other types of attribute values may be used) corresponding to the attribute 28.

The database 19 also includes observation cost data 43. An observation expense field 44 stores observation expense data 46 corresponding to the expense of determining an attribute value for the corresponding attribute 28. The expense data 46 will be used to rank the attribute 28 relative to other attributes 28, as will be discussed in greater detail, below.

In a mechanical context, the expense data 46 may correspond to the expense of labour, test consumables, parts and/or materials associated with investigating (or measuring) an attribute of a device, in order to answer the corresponding attribute question 38. For example, determining if a gas tank has gas in it would be very inexpensive, while dissembling an engine to determine if the pistons were scored would likely be moderately expensive in comparison.

For example, as illustrated in Table 1, the expense data 46 may indicate that the observation expense for a particular attribute is very expensive (5), expensive (4), moderately expensive (3), economical (2), or very economical (1). However, as will be understood, other scales and values may be used as appropriate. Typically, the expense data 46 will be approximated or otherwise determined by an expert based on the expert's experience, but the expense data 46 may be determined by reference to empirical data.

The database 19 may also include an observation time field 48 which stores observation time data 50 corresponding to the length of time for determining an attribute value for the corresponding attribute 28. The time data 50 will be used to rank the attribute 28 relative to other attributes 28, as will be discussed in greater detail, below. For example, as shown in Table 1, the time data 46 may indicate that the observation time for a particular attribute 28 is very long (5), long (4), moderate (3), short (2), or very short (1). However, as will be understood, other scales and values may be used as appropriate. The time data 50 will often be approximated or otherwise determined by an expert based on the expert's experience, but the time data 50 may also be determined by reference to empirical data.

While observation expense 44 and observation time 48 fields are described and illustrated herein, additional or other observation cost fields 43 for specific applications, such as observation risk, may be provided for the purpose of ranking attributes (discussed below). Observation cost fields 43 are typically determined to reflect the analysis that an expert in the particular application field would perform in solving a problem efficiently.

As should be understood, when used herein "observation cost" is intended to have a broader meaning than simply "expense" or "time", and should also be understood to reflect the concept of opportunity cost and risk. In a medical application, the observation cost may reflect the risk to a patient of determining attribute values such as symptoms or other information about the patient's condition. In such a context, invasive exploratory surgery may have a greater observation cost both in terms of expense and in terms of risk to the patient, than will simply taking the patient's temperature.

Figure 4A:
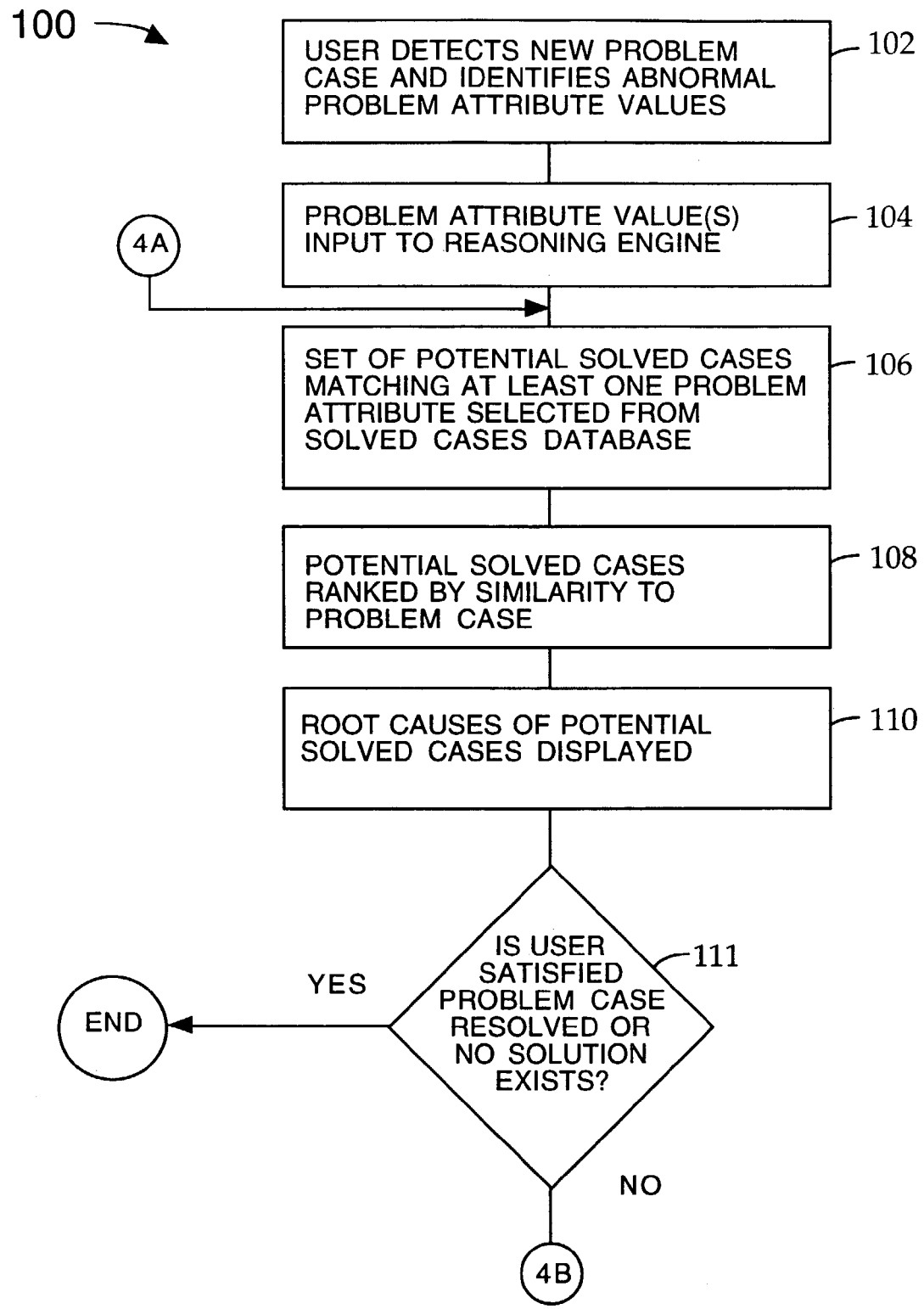
FIG. 4 is a flow diagram illustrating the steps of a method of the present invention.
Figure 4B:
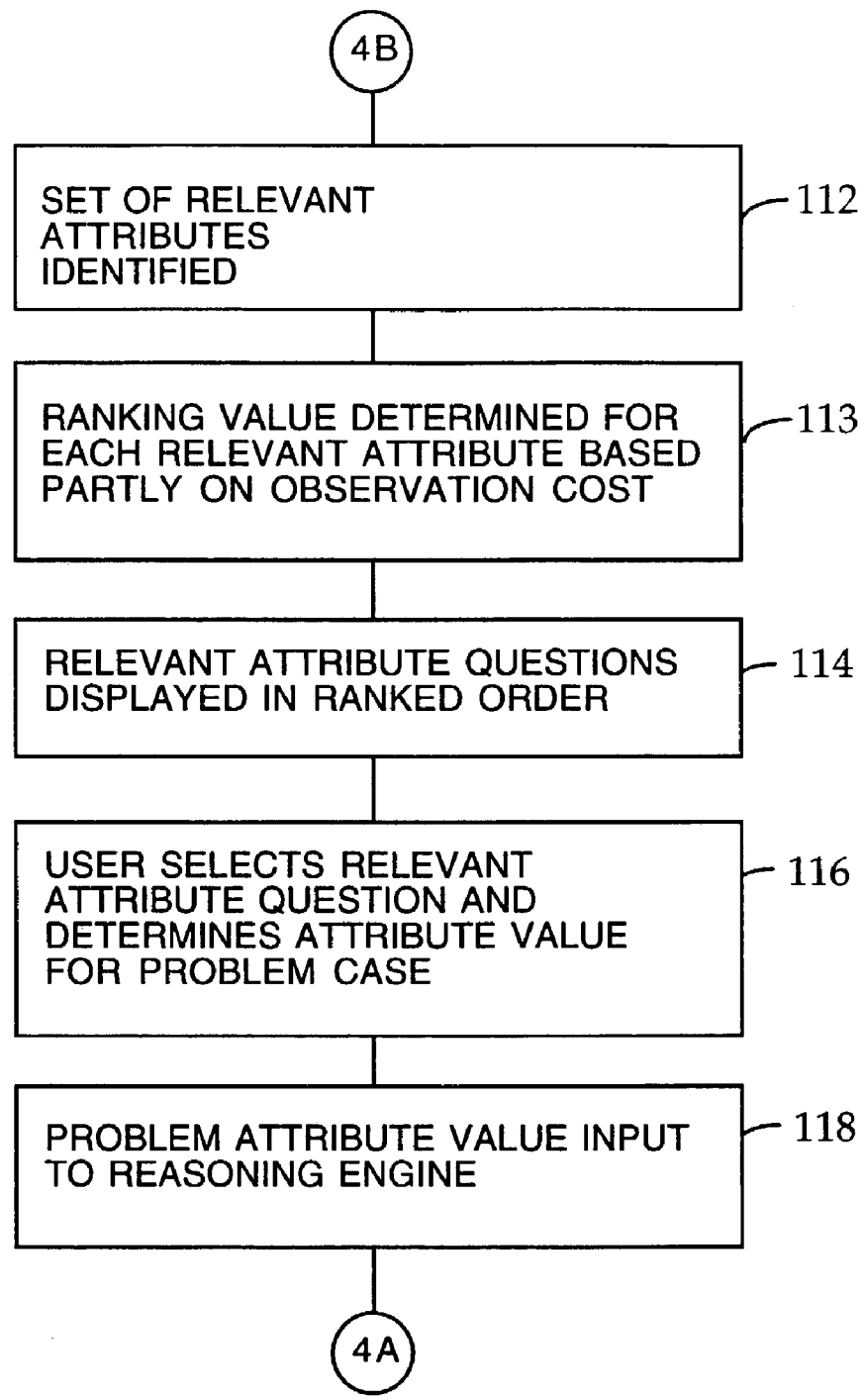

Referring now to FIG. 4 (in conjunction with FIG. 1), illustrated therein is the general process, referred to generally as 100, by which the CBR system 10 performs. A user first identifies a current problem case 60 for which a root cause is unknown (to the user) and identifies a set of problem observations or problem attribute values 62 (which differ from normal conditions) describing the problem 60 (Block 102). The problem attribute values are input to the reasoning engine 12 via the input device $16^A$ (Block 104).

The reasoning engine 12 identifies a set of potential solved cases 70 stored in the solved cases database 18 which possess attribute values 32 matching (or nearly matching) one or more of the problem attribute values (Block 106). For example, if a problem 60 has an observed attribute value 62 of "Temperature: 43° C." and a solved case 20 contains an attribute value 32 of "Temperature: 40°–70° C.", the case 20 is considered relevant to the problem 60.

Each potential solved case 70 is then ranked for similarity to the current problem case 60, typically by comparing the attribute values 32 of the potential solved case 70 with the observed attribute values 62 of the problem case 60 and calculating a similarity value (Block 108). Techniques for calculating a similarity value for each potential solved case 70 reflecting the similarity of the case 70 to the problem case 60 are disclosed in U.S. Pat. No. 5,822,743. Other calculation techniques for ranking potential cases 70 based on their "nearest neighbour" similarity to the problem 60 (a value typically between 0 and 1) may also be used, as will be understood. The root cause data 23 corresponding to each (or a number of the highest ranked) potential solved case is then displayed to the user on the display device $16^B$ (Block 110).

The user is free to review the displayed root cause(s) 23. Unless the user is satisfied that the root cause 23 for the correct solved case 90 corresponding to the problem case 60 has been determined, the processing steps continue (Block 111).

A set of relevant attributes 80 are then identified. The relevant attributes 80 include each attribute 34 for which an attribute value 32 exists in the set of potential solved cases 70 and for which no corresponding problem attribute value 62 has been input (Block 112). A ranking value, based in part on the corresponding observation cost data 43, for each relevant attribute 80 is then determined (Block 113). The set of relevant attributes 80 are then ranked, and the corresponding question values 38 (or a number of the highest ranked) are presented in ranked order to the user (Block 114). Calculations for determining a ranking value for each of the relevant attributes 80, are discussed in greater detail below.

As will be understood, the purpose of the ranking is to identify attributes 34 (and the corresponding questions 38) which will most efficiently reduce the number of potential cases 70, once a corresponding problem attribute value 62 is determined by the user and inputted into the reasoning engine 12. When used herein, the term "entropy change" and variations thereof, is intended to refer to the reduction in the number of potential cases 70, if a particular problem attribute value is determined and inputted.

The user selects one of the ranked relevant questions 38 and carries out the necessary investigations to determine the problem attribute value 62 in answer to the selected question 38 (Block 116). Typically, the user will answer the highest ranked question 38, although the user may exercise discretion and select a different ranked question 38 to answer.

The determined problem attribute value 62 is then input to the reasoning engine 12 (Block 118). The process then returns to and repeats Block 106, with the reasoning engine 12 identifying a new set 70 of potential solved cases, by comparing the solved case data 18 to each of the original input problem attribute values 62 in addition to the newly determined problem attribute value 62. As will be understood, the steps of Blocks 106 through 118 are repeated until at Block 111 the user is satisfied that a correct solution case 90 either has been resolved or does not exist in the solved cases database 18.

The ranking value calculation for each relevant attribute 34 is described below.

Many prior art induction-based decision-tree engines use "information gain" as a way of building up a list of relevant questions. Such prior art techniques base the information gain calculation on the entropy gain between the two diagnostic states (before making an observation and after). This requires expanding the observation leaves of each attribute and computing the entropy. This is impractical since an objective frequency for how often a case attribute value? occurs is difficult to gather in the real world.

To work around this limitation, the method of the present invention assumes the initial diagnostic state to have zero entropy, and assumes that all possible attribute values corresponding to an attribute have equal likelihood.

Figure 5:
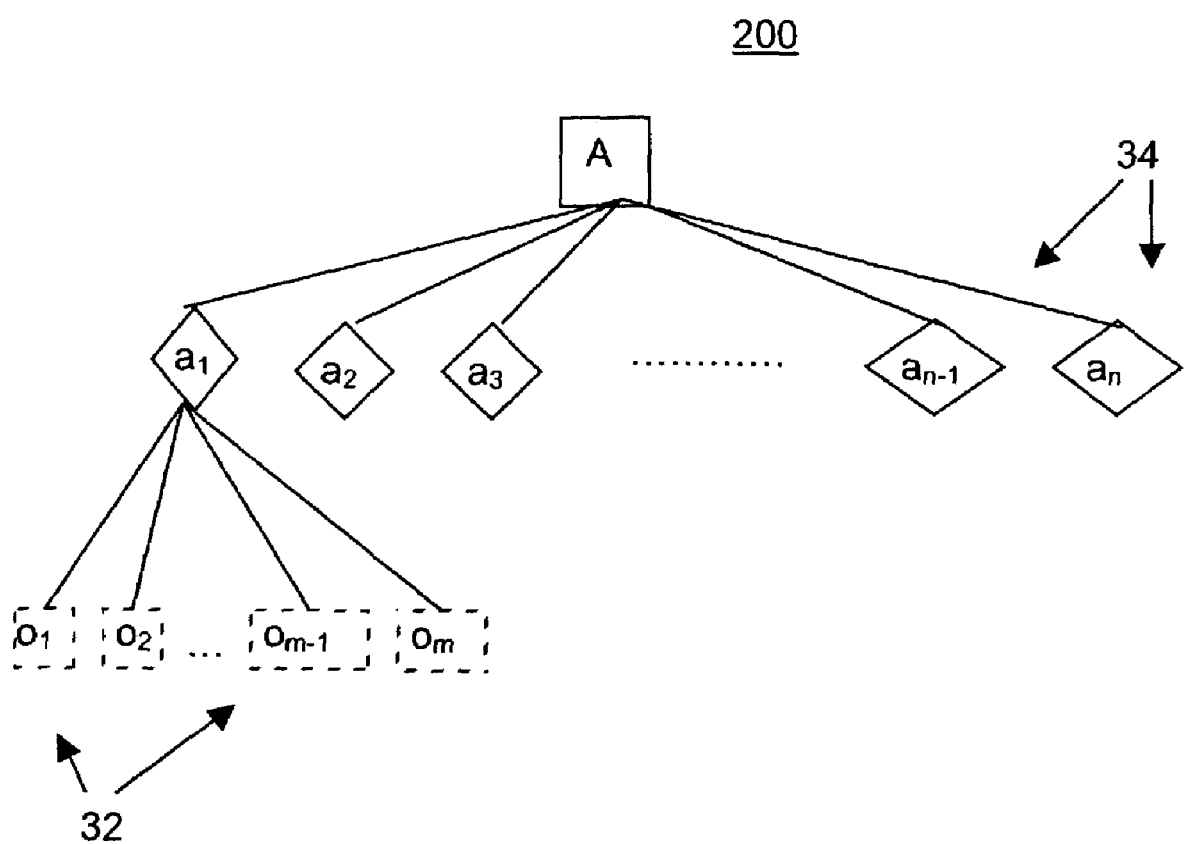
FIG. 5 is a schematic diagram of an attribute and observation tree.

FIG. 5 illustrates an attribute and observation tree, referred to generally as 200. Herein, "observation" is intended to be synonymous with "attribute value", unless a contrary intention is indicated.

Let A be the set 34 of n relevant attributes $(a_1-a_n)$ identified in Block 112.—Each relevant attribute 34 has a set of m associated observations $(o_1-o_m)$ or attribute values 32 in the set of potential cases 70. As illustrated in FIG. 5, these observations 32 are grouped to form the $2^{nd}$ level of the look-ahead tree 200.

For clarity, in FIG. 5 only the leaves 32 of attribute $a_1$ are expanded. Within each attribute 34, the frequency of observations is counted in the set of potential cases 70. All cases 20 are not counted equally. The case frequency 24, a subjective value determined by Case Base Developers ("CBDs"), is used in the counting process.

The probability ($p_{oi}$) of each observation 32 occurring is calculated according to Equation 1, set out below.

$$p_{oi} = \frac{\sum f_{oi}}{\sum f_{aj}}, i \in [1, m-1], j \in [1, n] \quad \text{(Eq. 1)}$$

where: $f_{aj}$ is the frequency of occurrence of a case with an attribute $a_j$ and $f_{oi}$ is the frequency of occurrence of a case with an observation $o_i$ The final frequency $o_m$ is typically associated with the unknown values for that attribute 34. The value for every attribute is not usually stored for each case 20 in the solved cases database 18. As set out in Equation 2, below, the probability of the remaining observations ($p_{om}$) occurring is calculated by summing the frequency 24 of the remaining cases 20 with an unknown observation corresponding to the specified attribute.

$$p_{om} = \frac{\sum_{a_j \not\in C_j} f_j}{\sum_{C_j} f_j}, j \in [1, n] \quad \text{(Eq. 2)}$$

As set out in Equation 3, below, the entropy change S in observing each attribute 34 is calculated based on the average of the entropies propagated upward by the observations 32 on the leaves below.

$$S(a_j) = \frac{1}{m}\sum_{i=1}^{m} p_{oi}\log_2 p_{oi}, j \in [1, n] \quad \text{(Eq. 3)}$$

The entropy calculation is performed for all n relevant attributes 80 found within the set of potential solved cases $C_a$ 70.

The ranking value of each relevant attribute 80 is a function of the following variables:

$O_{expense}$, the observation expense 46
$O_{time}$, the observation time 50
S, the entropy gain from making the observation, and
the maximum similarity of the cases in $C_a$ Each of these variables is taken into account in the following equation, Equation 4, for the ranking value v(a) of observing attribute a:

$$v(a)=S(a)-C_{expense}O_{expense}(a)-C_{time}O_{time}(a)+C_{sim}\max(\text{sim}(Obs, C_a)) \quad \text{(Eq.4)}$$

where $C_a$ is the set of cases within A that contain the attribute a.

The coefficients ($C_{expense}$, $C_{time}$, and $C_{sim}$) in Equation 4 represent the relative contribution to the ranking value relative to the value of entropy. The values for the coefficients have preferably been optimized for the particular system 10 application. The following parameter values have been found to produce acceptable results in a CBR application for jet engines: $C_{expense}=0.5$, $C_{time}=0.5$, and $C_{sim}=8.0$.

However, the optimal values of the coefficients ($C_{expense}$, $C_{time}$, and $C_{sim}$) to be used in Equation 4 may vary from one application to another. The objective is to minimize the number of irrelevant attribute questions 38 presented to a user when pursuing a new problem case 60.

The preferred method for determining the optimal values of the coefficients ($C_{expense}$, $C_{time}$, and $C_{sim}$) to be used in Equation 4 should consider the total number of questions asked as well as the total observation costs (eg. observation expenses and time). In matching a new problem case 60 to a particular solved case 90, the attribute questions 38 corresponding to the relevant attributes 80 may be ranked in order, but may be answered out of order by the user.

For each solved case 20 in the solved case database 18, the optimization technique of the present invention presents a matching new problem case to the reasoning system 12 for resolution. The total number of attribute questions 38 "answered" and the total observation cost, and observation time for "answering", are determined for matching all of the problem cases to their corresponding solved cases 20.

The optimization technique of the present invention presumes a "naive lucky" user. The user is presumed to always answer the top ranked attribute question 38 at each stage of the process. Each case is in turn taken as the target case. As noted above in relation to Blocks 106 to 118, upon the user answering the first or top ranked attribute question 38 (by inputting a new problem attribute value 32) from the target case, the reasoning engine 12 will perform a new search of the solved cases 20 to determine a new set of potential solved cases 70, and will repeat the process of determining and ranking the relevant attributes 80 (and corresponding relevant attribute questions 38) until the root cause 23 of the matching solved case 90 is resolved. Each case is used once as a target case, and the total observation costs of the attribute questions required to answer each case is summed.

Using mathematical minimization techniques, the process is repeated with different coefficient values. The coefficients ($C_{expense}$, $C_{time}$, and $C_{sim}$) are chosen to mutually minimize the total observation costs (total observation expense $O_{expense}$ and total observation time $O_{time}$).

Thus, while what is shown and described herein constitutes preferred embodiments of the subject invention, it should be understood that various changes can be made without departing from the subject invention, the scope of which is defined in the appended claims.

The invention claimed is:

1. A method for matching at least one solved case to a problem case, the method comprising:
   (a) storing solved case data correlated to a plurality of solved cases, wherein the solved case data comprises a set of attributes corresponding to each of the solved cases;
   (b) storing attribute data corresponding to a set of attributes;
   (c) storing observation cost data corresponding to each attribute in the set of attributes, wherein the observation cost data corresponding to an attribute is correlated to a cost of determining an attribute value corresponding to the attribute;
   (d) receiving problem attribute values for attributes correlated to the problem case;
   (e) determining a list of potential solved cases from said solved case data by comparing the problem attribute values to the attribute values of the plurality of solved cases;
   (f) determining a list of relevant attributes for which at least one potential solved case has an attribute value and for which no corresponding problem attribute value has been input; and (g) ranking said list of relevant attributes based at least in part on the observation cost data.

2. The method of claim 1, further comprising the step of:
(h) ranking said list of potential solved cases.

3. The method of claim 1, further comprising the step of:
(i) receiving a problem attribute value corresponding to a relevant attribute.

4. The method of claim 3, wherein step (i) comprises determining the problem attribute value.

5. The method of claim 3, further comprising repeating steps (f) and (g) following step (i).

6. The method of claim 2, further comprising the step of:
(i) receiving a problem attribute value corresponding to a relevant attribute;
and wherein steps (f) through (h) are repeated following step (i).

7. The method of claim 1, wherein the step of ranking said list of relevant attributes comprises determining a ranking value for each relevant attribute such that said ranking value is correlated to the observation cost data for that relevant attribute.

8. The method of claim 1, wherein step (a) further comprises storing case frequency data corresponding to each solved case, wherein said case frequency data corresponding to a solved case is correlated to the frequency of the solved case occurring relative to the frequency of other solved cases occurring.

9. A case-based reasoning system for matching at least one solved case to a problem case, wherein the reasoning system comprises:
(a) a solved case database comprising solved case data correlated to a plurality of solved cases, wherein the solved case data comprises a set of attribute values corresponding to each of the solved cases;
(b) an attribute database comprising a set of attributes and observation cost data corresponding to each of the attributes, wherein the observation cost data corresponding to an attribute is correlated to a cost of determining an attribute value corresponding to the attribute;
(c) an input device for inputting problem attribute values correlated to the problem case;
(d) a processor programmed to:
(i) determine a set of at least one potential solved case from said solved case database,
(ii) determine a set of relevant attributes for which at least one potential solved case has an attribute value and for which no corresponding problem attribute value has been input,
(iii) determine a ranking value for each relevant attribute such that said ranking value is correlated to the observation cost data for that relevant attribute, and
(iv) rank said set of relevant attributes; and
(e) an output device for displaying the list of potential solved cases and for displaying the set of ranked relevant attributes.

10. The case-based reasoning system as claimed in claim 9, wherein the processor is programmed to determine the set of potential solved cases by comparing the problem attribute values to the attribute values of the plurality of solved cases.

11. The case-based reasoning system as claimed in claim 10, wherein the processor is further programmed to rank the set of potential solved cases based at least in part on the similarity of the problem attribute values to the attribute values of each potential solved case.

12. The case-based reasoning system as claimed in claim 9, wherein the solved case database further comprises case frequency data corresponding to each solved case, wherein said case frequency data corresponding to a solved case is correlated to the frequency of the solved case occurring relative to the frequency of other solved cases occurring, and wherein the processor is further programmed to rank the potential set of solved cases based at least in part on the case frequency data.

13. A method for matching at least one solved case to a problem case in a case-based reasoning system, wherein the reasoning system comprises:
(a) a solved case database comprising solved case data correlated to a plurality of solved cases, wherein the solved case data comprises a set of attribute values corresponding to each of the solved cases;
(b) an attribute database comprising a set of attributes and observation costs data corresponding to each of the attributes, wherein the observation cost data corresponding to an attribute is correlated to a cost of determining an attribute value corresponding to the attribute;
wherein the method comprises the steps of:
(i) receiving problem attribute values correlated to the problem case;
(ii) determining a list of potential solved cases from said solved case database;
(iii) determining a list of relevant attributes for which at least one potential solved case has an attribute value and for which no corresponding problem attribute value has been input; and
(iv) determining a ranking value for each relevant attribute such that said ranking value is correlated to the observation cost data for that relevant attribute.

14. A method of creating data for use in a case-based reasoning system, the method comprising:
(a) storing on computer-readable media solved case data correlated to a plurality of solved cases, wherein the solved case data comprises a set of attribute values corresponding to each of the solved cases;
(b) storing on computer-readable media attribute data corresponding to a set of attributes;
(c) receiving observation cost data corresponding to each of the attributes in the set, wherein the observation cost data corresponding to an attribute is correlated to a cost of determining an attribute value corresponding to the attribute; and
(d) storing on computer-readable media the observation cost data.

15. The method of claim 14, wherein step (a) further comprises storing on computer-readable media case frequency data corresponding to each solved case, wherein said case frequency data corresponding to a solved case is correlated to the frequency of the solved case occurring relative to the frequency of other solved cases occurring.

* * * * *